(12) United States Patent
Mukherjee et al.

(10) Patent No.: US 9,200,084 B2
(45) Date of Patent: Dec. 1, 2015

(54) METHOD FOR THE PREPARATION OF A PARTICULATE REVERSIBLY CROSSLINKED POLYMERIC MATERIAL

(75) Inventors: Purnendu Mukherjee, Piscataway, NJ (US); Eric P. Wasserman, Hopewell, NJ (US)

(73) Assignee: Dow Global Technologies LLC

( * ) Notice: Subject to any disclaimer, the term of this patent is extended or adjusted under 35 U.S.C. 154(b) by 347 days.

(21) Appl. No.: 13/700,263

(22) PCT Filed: Jun. 8, 2010

(86) PCT No.: PCT/IB2010/001388
§ 371 (c)(1),
(2), (4) Date: Dec. 10, 2012

(87) PCT Pub. No.: WO2011/154759
PCT Pub. Date: Dec. 15, 2011

(65) Prior Publication Data
US 2013/0217873 A1    Aug. 22, 2013

(51) Int. Cl.
| | | |
|---|---|---|
| C08B 15/00 | (2006.01) | |
| C08B 3/10 | (2006.01) | |
| A61L 15/32 | (2006.01) | |
| A61K 47/48 | (2006.01) | |

(52) U.S. Cl.
CPC .................. C08B 3/10 (2013.01); C08B 15/005 (2013.01)

(58) Field of Classification Search
CPC ........ C08B 15/005; C08B 3/10; A61L 15/32; A61L 15/225; A61K 47/48
USPC ..................................................... 536/63, 91
See application file for complete search history.

(56) References Cited

U.S. PATENT DOCUMENTS

| | | |
|---|---|---|
| 3,362,847 A | 1/1968 | Day, Jr. |
| 3,461,115 A | 8/1969 | Schwarzer |
| 4,645,812 A | 2/1987 | Maier |
| 5,432,215 A | 7/1995 | Girg et al. |
| 5,498,705 A | 3/1996 | Oin |
| 5,973,036 A | 10/1999 | Matzinger et al. |
| 2003/0083389 A1 | 5/2003 | Kao et al. |
| 2004/0180208 A1 | 9/2004 | Bailey et al. |
| 2005/0143572 A1 | 6/2005 | Hammes |
| 2005/0276858 A1 | 12/2005 | Kao et al. |
| 2006/0100369 A1 | 5/2006 | Kao et al. |
| 2009/0124722 A1 | 5/2009 | Hudgins et al. |

FOREIGN PATENT DOCUMENTS

| | | |
|---|---|---|
| GB | 1017746 | 1/1966 |
| JP | 62192427 | 8/1987 |
| JP | 2003-073443 | 3/2003 |
| JP | 2003-160694 | 6/2003 |
| JP | 2003-212760 | 7/2003 |
| JP | 2009-143997 | 7/2009 |
| WO | 2009/144372 A1 | 12/2009 |

OTHER PUBLICATIONS

Arslanov, et al., Modification of Microcrystalline Cellulose by a Binary Mixture of Pyromellitic Dianhydride and Phosphoric Acid, Chemistry of Natural Compounds, vol. 32, No. 4, 1996.
Arslanov, et al., Acylation of Acetylcellulose with Pyromellitic Dianhydride, Chemistry of Natural Compounds, vol. 35, No. 4, 1999.
Karnitz, et al., Removal of Ca(II) and Mg(II) from Aqueous Single Metal Solutions by mercerized Cellulose ad Mercerized Sugarcane Bagasse Grafted with EDTA Dianhydride (EDTAD), Carbohydrate Polymers, vol. 79, No. 1, 2010, pp. 184-191.

(Continued)

*Primary Examiner* — Scarlett Goon
*Assistant Examiner* — Everett White

(57) ABSTRACT

The present invention relates to method for the preparation of a particulate reversibly-crosslinked polymeric material comprising: treating a particulate water-soluble hydroxyl-functional polymer in a liquid phase comprising a solvent mixture in that the hydroxyl-functional polymer is insoluble containing an organic solvent and water; a tetracarboxylic acid dianhydride represented by formula (I), 10 (I) wherein: U and V are independently selected from CH, N and P; 15 X is selected from a single bond, a saturated divalent ($C_1$-$C_{10}$) hydrocarbon group, O, S, NR, and PR, wherein R is selected from hydrogen and ($C_1$-$C_4$) alkyl; n and m are independently selected from 0 and 1; w is 1 or 2 with the proviso that; 20 if w is 1 then Y is X and if w is 2 then Y is selected from H and ($C_1$-$C_4$) alkyl, whereby there is no bond between both Y; and optionally a catalyst; to form a particulate reversibly-crosslinked polymeric material and 25 to a particulate reversibly-crosslinked polymeric material obtainable thereby.

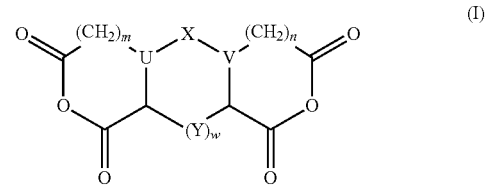

12 Claims, 2 Drawing Sheets

(56) References Cited

OTHER PUBLICATIONS

Karnitz, et al., Adsorption of Cu(II), Cd(II), and Pb(II) from Aqueous Single Metal Solutions by mercerized Cellulose and Mercerized Sugarcane Bagasse Chemically modified with EDTA dianhydride (EDTAD), Carbohydrate Polymers, vol. 77, No. 3, 2009, pp. 643-650.

Botaro, et al., Synthesis of Hydrogels of Cellulose Acetate (AC) cross-linked with 3,3', 4,4' Benzophenonetetracarboxylic dianhydride (BTDA): Characterization and Adsorption Physicochemical Study, Polimeros, vol. 19, No. 4, 2009. Abstract only.

METHOD FOR THE PREPARATION OF A PARTICULATE REVERSIBLY CROSSLINKED POLYMERIC MATERIAL

CROSS REFERENCE TO RELATED APPLICATIONS

This application is a 35 USC §371 national phase filing of PCT/IB2010/001388, filed Jun. 8, 2010.

The present invention relates to a method for the preparation of a particulate reversibly-crosslinked polymeric material and to a particulate crosslinked polymeric material obtainable by such method.

BACKGROUND OF THE PRESENT INVENTION

Some water-soluble polymers such as cellulose ethers are difficult to dissolve in water due to the fact that the first particles that come into contact with water immediately swell and stick to each other, forming a gel-like barrier that shields the remaining polymers from hydration. These water-soluble polymers are conveniently supplied as a particulate dry material that is then dissolved in water for the desired end use of such water-soluble polymers. The above-described gel-blocking behavior of water-soluble polymers is a considerable drawback for those applications of water-soluble polymers that comprise the solution of the particulate water-soluble polymer such as cellulose ethers in aqueous systems.

One approach used in industry to overcome this problem, if permissible in the end-use application, is to apply glyoxal to the cellulose ether to form a hydrolytically-unstable network. The crosslinking of the cellulose ether with glyoxal is therefore reversible in aqueous medium and thus treated cellulose ether can be suspended in aqueous medium and ultimately dissolved when the crosslinked network formed with glyoxal is hydrolytically cleaved. The drawback of this method is that glyoxal is considered as a toxic compound and is regenerated upon hydrolysis of the crosslinked network. Thus, alternatives avoiding the above-described gel-blocking behavior are desired.

U.S. Pat. No. 3,362,847 discloses a process for improving the water-dispersibility of water-soluble cellulose ether by treating the surface of the particulate cellulose ether with a combination of a water-soluble polybasic organic carboxylic acid having from 2 to 10 carbon atoms and a water-soluble organic polyamine having at least two primary amino groups. Preferably, the polybasic acid and amine are applied to the cellulose ether by dissolving the polybasic organic carboxylic acid and the water-soluble organic polyamine in a solvent, which is a non-solvent for the cellulose ether, and suspending the cellulose ether in such treating solution.

U.S. Pat. No. 3,461,115 relates to a process for the preparation of a macromolecular compound containing hydroxyl groups, which is soluble in water without forming lumps. This process comprises treating the water-soluble macromolecular compound in the solid state with 0.5 to 5% by weight of an aliphatic dicarboxylic acid containing 2 to 8 carbon atoms, or a salt or an ester thereof.

GB 1,017,746 describes a method of producing a crosslinked product from cellulose or a cellulose derivative, which comprises reacting a solution or suspension of the cellulose or cellulose derivative in an organic liquid with the anhydride of a tetra- or higher basic carboxylic acid in the presence of an organic is base containing nitrogen. This method allows preparing clear and transparent products in a simple way. According to the examples the cellulose derivative is dissolved in an organic solvent such as acetone and the crosslinking reaction results in a stiff, more or less transparent gel. This reference neither discloses the preparation of a water-soluble particulate polymeric material nor addresses the problem of gel-blocking when dissolving such a polymeric material.

US 2005/0143572 relates to a method for the production for cellulose ethers whereby the cellulose ethers having free hydroxyl groups are reacted with dicarboxylic and/or polycarboxylic acids and a nitrogen-containing compound. The process comprises intensively mixing essentially dry, pulverulent cellulose ether with a mixture of organic bifunctional and/or polyfunctional acid and nitrogen-containing compound in a non-nucleophilic organic solvent prior to reacting the cellulose ether to provide the modified cellulose ether, which can be stirred into water at a pH greater than or equal to 11 without agglutination.

The object of the present invention is to provide a process for the preparation of a particulate reversibly crosslinked polymeric material that can be effectively performed under mild conditions that result in delay of the dissolution of the water-soluble polymer in an aqueous system even at lower crosslinker levels. Another goal of the present invention is to avoid formation of by-products upon dissolution of the water-soluble polymers that may cause a health concern so that the products of the present invention can also be used in food, personal care or pharmaceutical applications.

SUMMARY OF THE INVENTION

This and other objects as will be discussed below have been attained by a method for the preparation of a particulate reversibly crosslinked polymeric material comprising:
treating a particulate water-soluble hydroxyl-functional polymer in a liquid phase comprising
  a solvent mixture in that the hydroxyl-functional polymer is insoluble comprising an organic solvent and water;
  a tetracarboxylic acid dianhydride represented by formula (I),

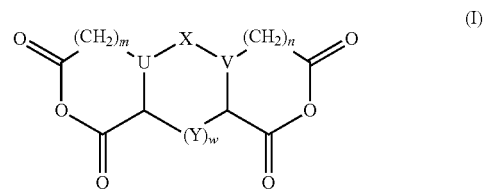

wherein:
U and V are independently selected from CH, N and P;
X is selected from a single bond, a saturated divalent ($C_1$-$C_{10}$) hydrocarbon group, O, S, NR, and PR, wherein R is selected from hydrogen and ($C_1$-$C_4$) alkyl;
n and m are independently selected from 0 and 1;
w is 1 or 2 with the proviso that;
if w is 1 then Y is X and
if w is 2 then Y is selected from H and ($C_1$-$C_4$) alkyl, whereby there is no bond between both Y; and
optionally a catalyst;
to form a particulate reversibly crosslinked polymeric material and by a particulate crosslinked polymeric material obtainable by such method.

The present inventors have surprisingly discovered that particulate water-soluble hydroxyl-functional polymers, especially cellulose derivatives like cellulose ether can be effectively crosslinked using a tetracarboxylic acid dianhydride represented by formula I as defined above under mild conditions when suspended in a water-containing solvent mixture in which the polymer is insoluble. This result was very surprising since a person skilled in the art would expect that carboxylic acid anhydrides would react in an aqueous medium to form the corresponding carboxylic acids, which have been proven considerably less effective compared to the tetracarboxylic acid dianhydrides according to the present invention.

Furthermore, it is a surprising result of the present invention that the method can be run under very mild reaction conditions, especially ambient conditions even without any catalysts like amines as taught in the above-discussed prior art. Thus, according to one aspect of the present invention the method is performed without the presence of amines or even without any kind of catalysts.

The crosslinked particulate hydroxyl-functional water-soluble polymer obtainable by the process of the present invention has significant advantages compared to prior art products. In contrary to the glyoxal-crosslinked material as used in the prior art no harmful compounds like glyoxal are released when dissolving the crosslinked particulate polymeric material of the present invention. The primary product that is released upon dissolution of the polymers according to the present invention is a tetracarboxylic acid, which is considered less harmful compared to glyoxal. Furthermore, a sufficient delay of dissolution of the particulate water-soluble polymer can be achieved at low crosslinker level and the dissolution rate can be tailored as a function of the relative amount of a tetracarboxylic anhydride.

Furthermore, the present method is applicable to a large number of hydroxyl-functional water-soluble polymers. Suitable hydroxyl-functional polymers to be employed in the present invention are cellulose derivatives, especially cellulose ethers, hydroxyl-functional acrylate polymers, polyvinyl alcohols, water-soluble polysaccharides, particularly starch and guar as well as xanthan gums. According to one aspect of the present invention the water-soluble hydroxyl-functional polymer is a cellulose derivative, whereby cellulose ethers are particularly preferred.

DETAILED DESCRIPTION OF THE PRESENT INVENTION

Figure 1:
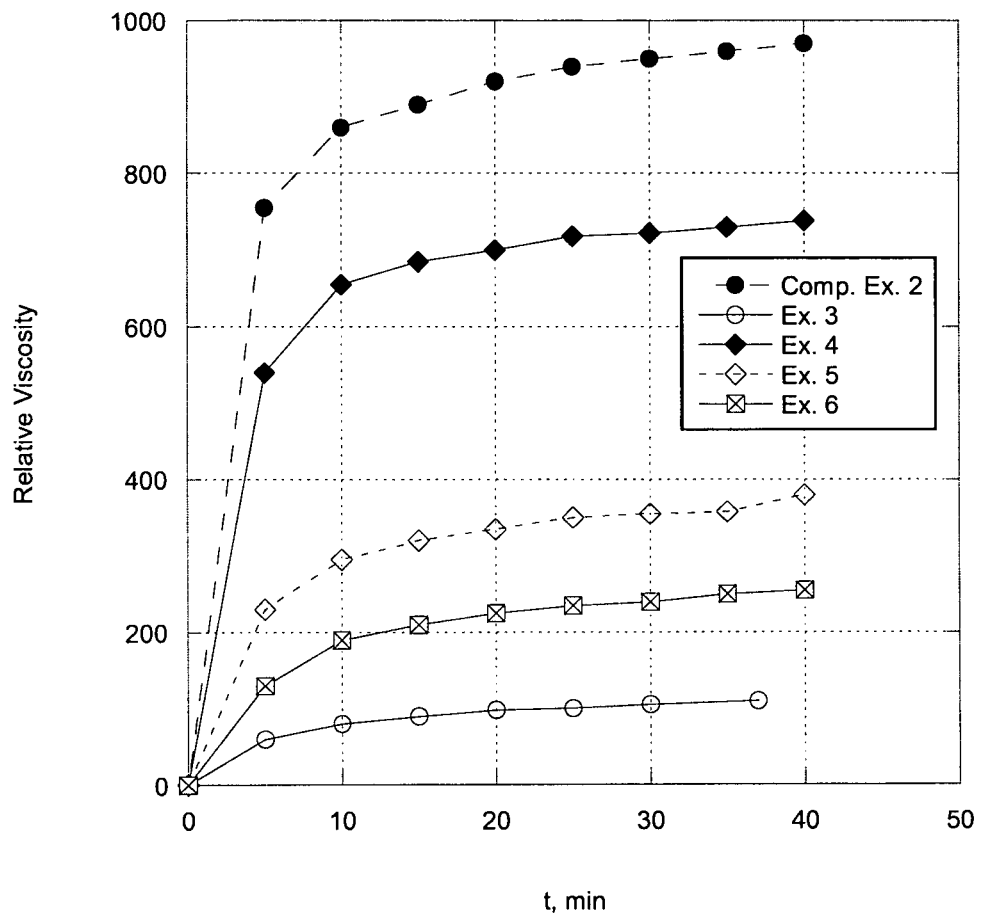
FIGS. 1 and 2 illustrate the viscosity over time when samples of particulate polymeric materials, reversibly crosslinked according the process of the present invention, and a comparative sample are dissolved in water.

According to the method of the present invention the particulate water-soluble hydroxyl-functional polymer is treated in a liquid phase comprising a solvent mixture in which the hydroxyl-functional polymer is insoluble containing an organic solvent and water, and a tetracarboxylic acid dianhydride represented by formula I as defined above. The selection of the organic solvent is not practically critical as long as the solvent in its mixture with water in a particular ratio results in a liquid phase in that the hydroxyl-functional water-soluble polymer is insoluble to obtain a suspension of the polymer in the liquid medium. It is preferred to use organic solvents that are, at least within the employed ratio of solvent to water, miscible with water in order to form a homogeneous continuous phase for the dispersion. Furthermore, of course, the organic solvent should not substantially react with the tetracarboxylic acid anhydride under the reaction conditions employed. It is also possible to use a mixture of two and more organic solvents as long as the above requirements are fulfilled. A suitable solvent may be selected from at least partially water-miscible aprotic solvents or lower alcohols, especially $C_2$ to $C_4$ alcohols. Suitable aprotic solvents are ketones, cyclic or acyclic ethers, esters and dimethyl sulfoxide. Suitable $C_2$ to $C_4$ alcohols are ethanol, 2-propanol, 1-butanol, 2-butanol, t-butanol. Suitable ketones are acetone and 2-butanone, a suitable ether is tetrahydrofuran and a suitable ester is ethyl acetate. During the preparation of the crosslinked particles, it is desired that the particles do not stick to each other or dissolve to any significant extent. If the particles stick to each other, the final product may consist of large lumps that would be difficult to re-hydrate after drying. Also, because this reaction is most efficiently conducted at relatively high solids contents (>5%), the dissolution of a substantial fraction of the polymer starting material would render the mixture extremely viscous and difficult to agitate and convey. Thus the organic/water mixture in which the polymer is suspended should not allow more than about 10, no more than 9, no more than 8, no more than 7, no more than 6, no more than 5, no more than 4, no more than 3, no more than 2, or no more than 1 wt.-% of the polymer to dissolve. It is preferred that the solvent mixture does not cause the particles to fuse into a mass if agitation ceases for up to 15 minutes.

The amount of water in the solvent mixture can be varied within wide ranges as long as, depending on the organic solvent or mixture of organic solvents employed and the type of hydroxyl-functional water-soluble polymer, the requirement that the polymer is substantially insoluble in the solvent mixture is achieved. The lower limit for the amount of water can be as low as 1 weight % of water based on the total weight of the solvent mixture. Other suitable lower limits of water in the solvent mixture are 2 weight %, 3 weight %, 4 weight %, 5 weight %, 6 weight %, 7 weight %, 8 weight %, 9 weight %, 10 weight %, 11 weight %, 12 weight %, 13 weight %, 14 weight %, 15 weight %, 16 weight %, 17 weight %, 18 weight %, 19 weight %, 20 weight % based on the total weight of the solvent mixture depending on the type of hydroxyl-functional water-soluble polymer and the one or more organic solvents to be used in the solvent mixture; the upper limit of the water content may be as high as 60 weight % based on the total weight of the solvent mixture. Other suitable upper limits are 55 weight %, 50 weight %, 45 weight %, 40 weight %, 35 weight %, 30 weight %, 25 weight %, 24 weight %, 23 weight %, 22 weight %, 21 weight %, 20 weight %, 21 weight %, 20 weight %, 19 weight %, 18 weight %, 17 weight %, 16 weight %, 15 weight %, 14 weight %, 13 weight %, 12 weight %, 11 weight %, or 10 weight % based on the total weight of the solvent mixture.

Without wanting to be bound by theory, it is believed that the water present in the solvent mixture according to the method of the present invention activates the hydroxyl-functional water-soluble polymers and allows the penetration of the tetracarboxylic acid dianhydride into the polymer particles below the surface. It was surprisingly found, in contrast to the expectations, that the water does not deactivate the tetracarboxylic acid dianhydride but on the contrary has a positive effect on process efficiency and also on product properties. Especially the crosslinking efficiency of very low levels of crosslinker may be attributed to the penetration of the crosslinker into outer areas of the polymer particles with the result that not only surface crosslinking but also crosslinking underneath the surface layer of the polymer particle occurs The water-soluble polymeric polyol may have a solubility in water of at least 1 g, more preferably at least 3 g, most preferably at least 5 g in 100 g of distilled water at 25° C. and 101325 Pa (1 atm).

The water-soluble polymeric polyol is preferably selected from one or more polysaccharides, homo- and copolymers comprising in polymerized form an unsaturated alcohol such as 2-hydroxyethyl acrylate or a vinyl alcohol.

The water-soluble polymeric polyol generally has a weight average molecular weight of at least 10,000, preferably at least 12,000, more preferably at least 15,000, most preferably at least 18,000. The preferred upper limit for the weight average molecular weight largely depends on the type of polymer. Generally the weight average molecular weight of the water-soluble polymer is up to 10,000,000, preferably up to 8,000,000, more preferably up to 5,000,000. The weight average molecular weight is determined by light scattering according to the Standard Test Method ASTM D-4001-93 (2006).

One preferred type of water-soluble polymer a) is a polysaccharide. Examples of polysaccharides include gum arabic, xanthan gum, gum karaya, gum tragacanth, gum ghatti, carrageenan, dextran, alginates, agar, gellan gum, gallactomannans such as guar and locust bean gums, pectins, starches, starch derivatives, guar derivatives, xanthan derivatives, and cellulose derivatives. Starch derivatives, guar derivatives and xanthan derivatives are described in more detail in European patent EP 0 504 870 B, page 3, lines 25-56 and page 4, lines 1-30. Useful starch derivatives are for example starch ethers, such as hydroxypropyl starch or carboxymethyl starch. Useful guar derivatives are for example carboxymethyl guar, hydroxypropyl guar, carboxymethyl hydroxypropyl guar or cationized guar.

Preferred hydroxypropyl guars and the production thereof are described in U.S. Pat. No. 4,645,812, columns 4-6. Preferred polysaccharides are cellulose esters or cellulose ethers. Preferred cellulose ethers are carboxy-$C_1$-$C_3$-alkyl celluloses, such as carboxymethyl celluloses; carboxy-$C_1$-$C_3$-alkyl hydroxy-$C_1$-$C_3$-alkyl celluloses, such as carboxymethyl hydroxyethyl celluloses; $C_1$-$C_3$-alkyl celluloses, such as methylcelluloses; $C_1$-$C_3$-alkyl hydroxy-$C_{1-3}$-alkyl celluloses, such as hydroxyethyl methylcelluloses, hydroxypropyl methylcelluloses or ethyl hydroxyethyl celluloses; hydroxy-$C_{1-3}$-alkyl celluloses, such as hydroxyethyl celluloses or hydroxypropyl celluloses; mixed hydroxy-$C_1$-$C_3$-alkyl celluloses, such as hydroxyethyl hydroxypropyl celluloses, or alkoxy hydroxyethyl hydroxypropyl celluloses, the alkoxy group being straight-chain or branched and containing 2 to 8 carbon atoms. Most preferably, the composition comprises a water-soluble cellulose ether, such as a methylcellulose with a degree of methyl substitution $DS_{methoxyl}$ of from 1.2 to 2.2, preferably from 1.5 to 2.0, or a hydroxypropyl methylcellulose with a $DS_{methoxyl}$ of from 0.9 to 2.2, preferably from 1.1 to 2.0 and a $MS_{hydroxypropoxyl}$ of from 0.02 to 2.0, preferably from 0.1 to 1.2. Generally the weight average molecular weight of the polysaccharide is up to 20,000,000, preferably up to 5,000,000, more preferably up to 1,000,000.

More preferably, the water-soluble polymer is an above-described cellulose ether. Most preferably, the water-soluble polymer is hydroxyethyl cellulose, cationic hydroxyethyl cellulose, hydroxypropyl methyl cellulose, or methyl cellulose.

One advantage of the process of the present invention is that due to be insolubility of the water-soluble hydroxyl-functional polymer in the solvent mixture relatively high concentrations of a polymer in the liquid phase can be used in the method according to the present invention. Water-soluble hydroxyl-functional polymers, especially cellulose ethers substantially increase the viscosity of the solution even at very low concentrations. Since according to the present invention the solvent mixture is selected to avoid an appreciable dissolution of the polymer in the liquid phase the substantial increase of the viscosity can be avoided even at very high concentration of the hydroxyl-functional water-soluble polymer. Thus the method of the present invention can still be run efficiently at an amount of particulate water-soluble hydroxyl-functional polymer of as high as 50 weight % based on the total weight of the liquid phase. Suitable upper limits for the amount of the polymer are 45 weight %, 35 weight %, 30 weight %, 25 weight %, or 20 weight % of polymer based on the total weight of the liquid phase. Suitable lower limits for the amount of water-soluble hydroxyl-functional polymer are 1 weight %, 5 weight %, 7 weight %, 10 weight % or 15 weight % based on the total weight of the liquid phase.

The tetracarboxylic acid dianhydrides according to the present invention are represented by formula I:

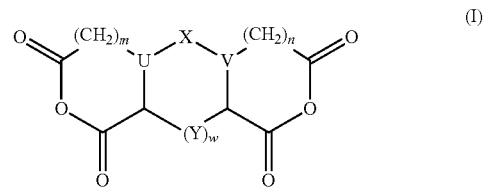

wherein:
U and V are independently selected from CH, N and P;
X is selected from a single bond, a saturated divalent ($C_1$-$C_{10}$) hydrocarbon group, O, S, NR, and PR, wherein R is selected from hydrogen and ($C_1$-$C_4$) alkyl;
n and m are independently selected from 0 and 1;
w is 1 or 2 with the proviso that;
if w is 1 then Y is X and
if w is 2 then Y is selected from H and ($C_1$-$C_4$) alkyl, whereby there is no bond between both Y.

Suitable compounds to be used in accordance of the present invention are represented by formula I wherein U and V are independently selected from CH and N, particularly U and V are CH, X is independently selected from a single bond and a saturated divalent ($C_1$ to $C_4$) hydrocarbon group and if w is 2 then Y is H. Particularly suitable tetracarboxylic acid dianhydrides are selected from 1,2,3,4-butanetetracarboxylic acid dianhydride, ethylenediaminetetraacetic acid dianhydride and 1,2,3,4-cyclopentanetetracarboxylic acid dianhydride.

As discussed above one advantage of using the tetracarboxylic acid dianhydrides according to the present invention as crosslinkers is that these crosslinkers are very effective already at low levels, and that the dissolution behavior of the reversibly crosslinked polymeric material according to the present invention can be easily tailored by selecting the appropriate level of the crosslinkers. Thus, the amount of such tetracarboxylic acid dianhydride can be varied with in wide ranges. A lower limit for the amount of tetracarboxylic acid dianhydride is 10 wppm, 50 wppm, 100 wppm, 150 wppm, 200 wppm, 250 wppm, 300 wppm, 350 wppm, 400 wppm, 450 wppm, 500 wppm based on the total weight of hydroxyl-functional polymer. Suitable upper limits for the amount of tetracarboxylic acid dianhydride according to the present invention are 50,000 wppm, 40,000 wppm, 30,000 wppm, 25,000 wppm, 20,000 wppm, 15,000 wppm, 10,000 wppm, 8,000 wppm, 7,000 wppm, 6,000 wppm, 5,000 wppm, 4,000 wppm, 3,000 wppm, 2,500 wppm, 2,000 wppm, 1,800 wppm, 1,700 wppm, 1,600 wppm, 1,500 wppm, 1,400 wppm, 1,300 wppm, 1,200 wppm, 1,100 wppm, 1,000 wppm based on the total weight of the hydroxyl-functional polymer. At high crosslinker levels for example at least 1,000 wppm, or at least 1,500 wppm, or at least 2,000 wppm, or at least 2,500 wppm, or at least 3,000 wppm, or at least 4,000 wppm based on the total weight of the hydroxyl-functional polymer the dissolution rate in water of the reversibly crosslinked hydroxyl-functional water-soluble polymer according to the present invention under neutral conditions may be low.

In embodiments wherein the above-described high levels of crosslinkers are used the particulate polymeric material withstands dissolution under neutral condition but dissolves more rapidly if the pH of the aqueous system changes to acidic or basic conditions. This allows for a pH control of the dissolution rate of the reversibly crosslinked polymer particles according to the present invention in aqueous systems.

As mentioned above one advantage of the present invention is that the method is very effective under mild reaction conditions even without the use of any catalysts but catalysts may of course be used, if appropriate. Consequently, the amount of catalysts can vary within wide ranges. Suitable amounts of catalysts are 0.001 to 100 mol %, preferably 0.1 to 10 mol %, more preferred 0.5 to 5 mol % based on the total moles of anhydride groups. Suitable catalysts may be selected from metal alkoxides, metal carboxylates, Brønsted acids and Lewis bases. For example imidazole may be used as catalyst.

According to one embodiment of the present invention the particulate water-soluble hydroxyl-functional polymer may be treated with a liquid phase by suspending the polymer in the liquid phase thereby forming a particulate reversibly crosslinked polymeric material. Subsequently, the particulate reversibly crosslinked polymeric material is separated from the liquid phase. Suitable separation methods are all solid-liquid separation methods known to a person skilled in the art. Examples are filtration, sedimentation, centrifugation and evaporation. The recovered particulate polymeric material may be washed and dried.

Alternative the particulate water-soluble hydroxyl-functional polymer may be agitated in a high-shear mixer for example horizontal ploughshare mixer or in a fluidized bed and then treated with the above described aqueous phase by spraying the aqueous phase onto the polymeric particles. The above-obtained treated polymer particles may be subsequently washed and dried.

The present invention will now be described in more details with reference to the following examples.

Following Materials were Used:

Pyromellitic acid anhydride (97%) was obtained from Aldrich.

1,2,3,4-Butanetetracarboxylic acid (99%) was purchased from Aldrich.

Ethylenediaminetetraacetic acid dianhydride (98%) was obtained from TCA America.

1,2,3,4-Cyclopentanetetracarboxylic acid (90%) was purchased from Aldrich.

Acetic anhydride (99.4%) was obtained from Fischer Scientific.

All materials were used as received from commercial sources.

Measuring Methods:

The dissolution behavior was evaluated in a Brabender hydration apparatus as described below:

Equipment:

Brabender Visco-Corder® Model VC-3/A, fully recording, stepless variable SCR speed control, with rpm display up to 200 rpm, 115 VAC, 60 Hz (Brabender Instruments Inc., South Hackensack, N.J., USA), equipped with a stainless steel sensor paddle of 4.125" (10.5 cm) total length, having two vertical rectangular wings of 1" (2.5 cm) width and 1.625" (4 cm) height, a jacketed sample bowl for use with heat transfer coil assembly, a 250 ml stainless steel beaker, a circulating water bath and a pH meter with standard calomel reference electrode and pH electrode.

Procedure:

The stainless steel beaker is centered in the jacketed sample bowl. The space between the jacketed sample bowl and beaker is filled with water. The beaker is charged with 200 ml of solvent (either distilled water or any buffered aqueous solution, as the case may be). The viscometer is turned on and the paddle is allowed to stir the solvent at 200 rpm. The solvent is allowed to equilibrate at 25.0±0.2° C. A pre-weighed sample of the polymer is added to the solvent while stirring. The polymer is added slowly to avoid lumping, but in less than one minute. The chart recorder is turned on when the polymer is added (time=0). The viscometer is allowed to run until the viscosity deflection reaches a constant value ($C_{max}$).

Example 1

Preparation of 1,2,3,4-butanetetracarboxylic acid dianhydride (BTCA-DA). [Follows the procedure of. Yang, C. Q.; X. J. Appl. Polym. Sci. 1998, 70, 2711-2718.]

A 100 ml round-bottom flask with thermometer attached was charged with stirbar, 1,2,3,4-butanetetracarboxylic acid (BTCA, 29.024 g, 124 mmol) and acetic anhydride (26.454 g, 259 mmol, 2.1 eq.) The flask was attached to a Schlenk line and the air was replaced by nitrogen. The mixture was heated to mild reflux for 3.5 h, allowed to cool to 31° C., and then unsealed and filtered through a medium glass frit with vacuum assistance, washed with ethyl acetate (50 ml) followed by hexane (20 ml). The sample was kept under vacuum overnight at 30° C. Yield: 23.84 g fine, white powder (97%), M.P. 264.88° C. by differential scanning calorimetry (DSC).

Example 2

Treatment of Hydroxyethyl Cellulose with BTCA-DA

Hydroxyethyl cellulose having an ethylene oxide molar substitution level (EOMS) of 1.586 and a viscosity of 7300 cP (measured at 1% in distilled water at 25° C. using spindle 2 and a stir speed of 6 rpm) (10.05 g) was slurried in 100 ml of a mixture of acetone and distilled water (90:10 v:v), then were added BTCA-DA (from Example 1, 0.4276 g) and imidazole (0.2055 g) for 3 h at ambient temperature. The mixture was then filtered and washed three times with 100 ml acetone/water (90:10 v:v), allowed to dry in air and then dried overnight under vacuum at 50° C. A portion of the sample (1.9 g) which had been ground in a mortar and pestle and passed through a 30 mesh sieve was added to 200 ml of an aqueous buffered solution at pH 7.2 at 25° C. in a Bradender hydration apparatus. The solid did not increase the viscosity of the slurry over the course of 1 h and sank to the bottom of the jar when agitation was stopped.

Comparative Example 1

Treatment of Hydroxyethyl Cellulose with BTCA

The same polymer used in Example 2 (10.14 g) was slurried in 100 ml of a mixture of acetone and distilled water (90:10 v:v, 0.8293 g/ml), then were added BTCA (0.5066 g) and imidazole (0.2040 g) for 3 h at ambient temperature.

Isolation and purification of the product was done in a manner similar to that of Example 2. When 1.9 g of this sample (having passed through 30 mesh sieve) were added to 200 ml pH 7.2 buffered solution at 25° C. in a Brabender hydration apparatus, the mixture rapidly built viscosity, approaching 50% of its maximum within 7 min. Several large gels were observed in the mixture.

Example 3

The same polymer used in Example 2 (10 g) was slurried in 100 ml of a mixture of acetone and distilled water (90:10 v:v). To this was then added 1 ml of a freshly-prepared solution of 100 mg of BTCA-DA in 20 g acetone/water (90:10 v:v). The mixture was stirred at room temperature for 3 h, followed by filtration, washing, drying, and sieving as in Example 2. In a hydration experiment at pH 7.2 viscosity rose slowly and reached 100 (rel. units) after 37 min.

Comparative Example 2

The conditions of Example 3 were repeated except no BTCA-DA solution was is added. In a hydration experiment at pH 7.2, viscosity rose rapidly and reached 970 (rel. units) after 40 min.

Example 4

The conditions of Example 3 were repeated except 0.5 ml of BTCA-DA solution were added. In a hydration experiment at pH 7.2, viscosity rose rapidly and reached 738 (rel. units) after 40 min.

Example 5

The conditions of Example 3 were repeated except 0.6 ml of BTCA-DA solution were added. In a hydration experiment at pH 7.2, viscosity rose at a moderate rate and reached 380 (rel. units) after 40 min.

Example 6

The conditions of Example 3 were repeated except 0.75 ml of BTCA-DA solution were added. In a hydration experiment at pH 7.2, viscosity rose at a moderate rate and reached 255 (rel. units) after 40 min.

The evolution of viscosity over time can be seen for Examples 3-6 and Comparative Example 2 in FIG. 1.

Comparative Example 3

To a slurry of the same hydroxyethyl cellulose used in Example 2 (10 g) in 100 ml acetone/water (90:10 v:v) were added 2.5 ml of a solution of 0.1033 g of pyromellitic acid anhydride (1,2,4,5-benzenetetracarboxylic acid dianhydride) and the resulting slurry was stirred for 3 h at room temperature. The product was recovered and isolated as in Example 2. The behavior in a hydration experiment at pH 7.2 was indistinguishable from that described in Comparative Example 2.

Example 7

Preparation of 1,2,3,4-cyclopentanetetracarboxylic acid dianhydride 10 g of cis,cis,cis,cis-1,2,3,4-Cyclopentanetetracarboxylic acid (10 g, 41 mmol) and stirbar were placed in a two-arm round-bottom flask to which was attached a reflux condenser. Acetic anhydride (8.894 g, 87 mmol, 2.1 eq.) was added via syringe. Nitrogen was allowed to flow through a side arm for about 30 min. Then a thermometer was attached to the side arm and the reflux was started. After 3 h of is refluxing, the reaction mixture was allowed to cool. Product was isolated by filtration through a medium frit and washing with 25 ml of ethyl acetate and 20 ml of hexane. Product was dried in a vacuum oven at 50° C. overnight. Yield: 8.16 g (95%), M. P.=213.8° C.

Example 8

To a slurry of the same hydroxyethyl cellulose used in Example 2 (10 g) in 100 ml acetone/water (90:10 v:v) was added 1 ml of a freshly-prepared solution of 0.005 g of 1,2,3,4-cyclopentanetetracarboxylic acid dianhydride in dimethylsulfoxide (DMSO, 10 g) and the resulting slurry was stirred for 3 h at room temperature. The product was recovered and isolated as in Example 2. In a hydration experiment at pH 7.2, viscosity rose slowly and reached 140 (rel. units) after 38 min.

Example 9

To a slurry of the same hydroxyethyl cellulose used in Example 2 (10 g) in 100 ml acetone/water (90:10 v:v) were added 1.5 ml of a freshly-prepared solution of 0.1031 g of ethylenediaminetetracarboxylic acid dianhydride (EDTA-DA) in DMSO (20 g) and the resulting slurry was stirred for 3 h at room temperature. The product was recovered and isolated as in Example 2. In a hydration experiment at pH 7.2, viscosity rose slowly and reached 100 (rel. units) after 42 min.

Example 10

The conditions of Example 9 were repeated except 1 ml of a solution of EDTA-DA (0.1050 g) in DMSO (20 g) was added. In a hydration experiment at pH 7.2, viscosity rose at a moderate pace and reached 380 (rel. units) after 45 min.

Example 11

The conditions of Example 9 were repeated except 0.8 ml of a solution of EDTA-DA (0.1040 g) in DMSO (20 g) were added. In a hydration experiment at pH 7.2, viscosity rose rapidly and reached 740 (rel. units) after 40 min.

Figure 2:
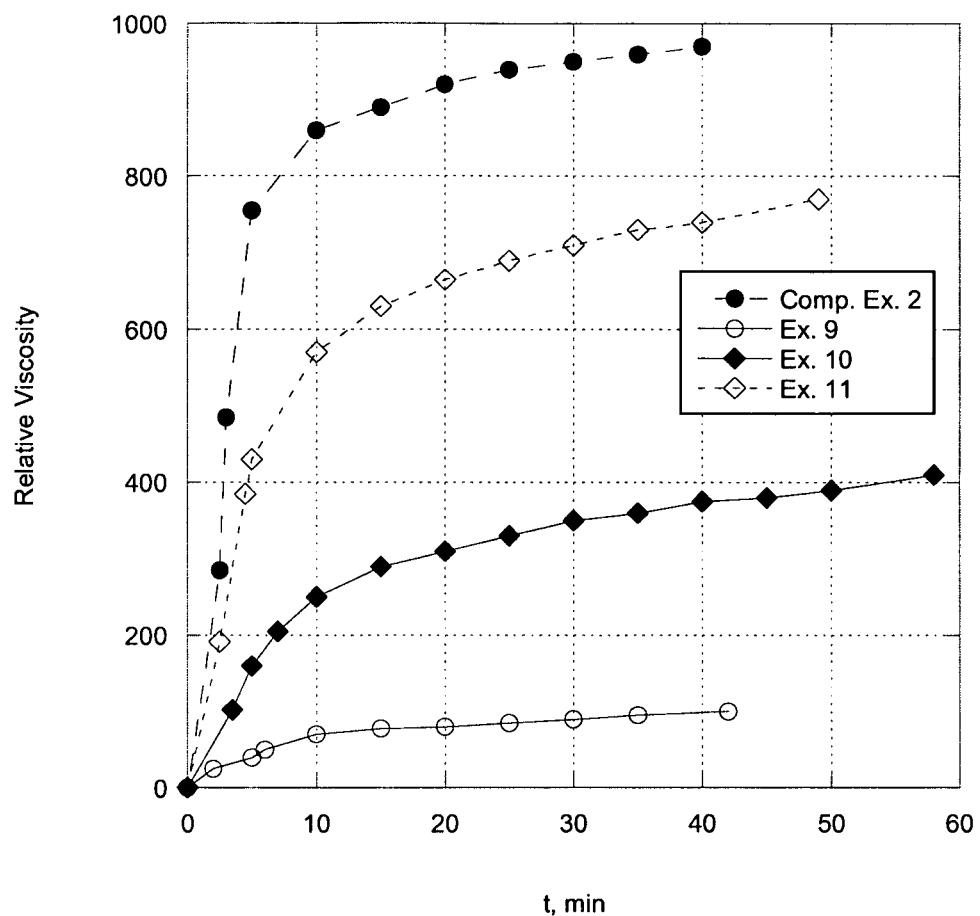

The evolution of viscosity over time can be seen for Examples 9 to 11 and Comparative Example 2 in FIG. 2.

The invention claimed is:
1. A method for the preparation of a particulate reversibly-crosslinked polymeric material comprising:
treating a particulate water-soluble hydroxyl-functional polymer selected from hydroxyethyl celluloses and hydroxypropyl celluloses in a liquid phase comprising
 a solvent mixture in that the hydroxyl-functional polymer is insoluble comprising an organic solvent and water, the amount of water being 2 to 50 weight %, based on the total weight of the solvent mixture; and
 a tetracarboxylic acid dianhydride;
 selected from group consisting of 1,2,3,4-butanetetracarboxylic acid dianhydride; ethylenediaminetetraacetic acid dianhydride; and 1,2,3,4-cyclopentanetetracarboxylic acid dianhydride;
to form a particulate reversibly-crosslinked polymeric material.

2. The method of claim 1, comprising a) suspending and maintaining the particulate water-soluble hydroxyl-functional polymer in the liquid phase to form the particulate reversibly-crosslinked polymeric material; and b) separating the particulate reversibly-crosslinked polymeric material from the liquid phase.

3. The method of claim 1, wherein the solvent mixture comprises water in an amount of 5 to 30 weight %, based on the total weight of the solvent mixture.

4. The method of claim 1, wherein the organic solvent is selected from acetone, 2-propanol, t-butanol, ethanol, tetrahydrofuran, 2-butanone and ethylacetate.

5. The method of claim 1, wherein the tetracarboxylic acid dianhydride is present in the liquid phase in an amount of 10-50,000 wppm, based on the total weight of hydroxyl-functional polymer.

6. The method of claim 1, wherein the catalyst is present in amounts of 0.001 to 10 mol % based on the total moles of anhydride groups.

7. The method of claim 1, wherein the liquid phase additionally comprises a catalyst selected from metal alkoxides, metal carboxylates, Brønsted acids and Lewis bases.

8. The method of claim 7, wherein the catalyst is imidazole.

9. The method of claim 1, wherein
the hydroxyl-functional polymer is cationically-modified hydroxyethyl cellulose.

10. The method of claim 1, wherein the particulate water-soluble hydroxyl-functional polymer is present in amount of 1-50 weight %, based on the total weight of the liquid phase.

11. The method of claim 1 wherein the liquid phase additionally comprises a catalyst.

12. The method of claim 1 wherein the method additionally comprises the steps of washing and drying the particulate reversibly-crosslinked polymeric material.

* * * * *